Jan. 23, 1968  G. F. LOVELESS  3,365,054

SUSPENSION FOR A VIBRATORY CONVEYOR

Filed Oct. 5, 1966

INVENTOR
GERALD F. LOVELESS
BY

United States Patent Office 3,365,054
Patented Jan. 23, 1968

3,365,054
SUSPENSION FOR A VIBRATORY CONVEYOR
Gerald F. Loveless, 35 Mill St., Stockton, N.Y. 14784
Filed Oct. 5, 1966, Ser. No. 584,487
10 Claims. (Cl. 198—220)

ABSTRACT OF THE DISCLOSURE

A vibratory conveyor wherein the conveyor is supported on Z-shaped members pivoted to the conveyor at one corner of the Z and at the base of the other corner of the Z. The ends of the Z remote from the pivot points are resiliently supported against the conveyor and against the support members respectively. This arrangement can be used in a cylinder feeder as well as in a linear feeder.

---

This invention relates to material handling machines and equipment and, more particularly, to vibrating or reciprocating machines and methods for handling products and materials during processing, screening, inspection, grading, packing, conveying, sorting, and other well known processes.

Vibrating conveyors and equipment for the foregoing methods and processes are well known to the art, however, all known devices of this type have certain disadvantages.

The present invention provides a suspension system or suspension unit for supporting such vibratory equipment. The improved suspension system and method is referred to herein as "Z-bar" support units. They may be used for overhead installations, inverted or upright, main floor installations, sub-floor installations, underground or underfloor, or any other structural support means, also cabinet enclosers or built in conjunction with other machines and equipment. They are capable of operating without transferring or connecting any substantial motion or vibration to the surrounding or adjacent structures.

It is very desirable, if not imperative, that no motion or vibration be transmitted to the base components or structure from the movable or vibratory or reciprocating parts of the equipment. When such vibration is transferred, it absorbs additional power from the driving unit and generally reduces the efficiency of the system. It has been noted that when moving materials by reciprocating equipment as in the device disclosed herein, only thirty percent of the total weight of the materials handled reacts as dead weight on the reciprocating parts of the equipment. The Z-bar support arms place the fixed weight of reciprocal components and the variable weights of the materials handled in a balanced movable and adjustable position. Thus, control is allowed and a natural frequency of the system may be utilized with the result that the driving power requirement is reduced. The action and the reaction of the suspension system is utilized more effectively and with greater efficiency.

The Z-bar supporting arms support the movable components and the varying materials of the load. The Z-bars equalize the forces and therefore increase the efficiency of the unit. This would not be possible when flat springs or arms are used in near vertical position to the base in other known suspension systems.

It is also feasible to produce the Z-bar support units in a complete assembly that can be used on existing equipment or manufactured into complete new devices of improved equipment.

It is, accordingly, an object of the invention to provide an improved suspension system for use in a vibratory type of equipment.

Another object of the invention is to provide an improved vibratory device with balance and frequency controlled means.

Another object of the invention is to provide a vibratory device, which is simple in construction, economical to manufacture, and simple and efficient to use.

Another object of the invention is to provide a generally Z-shaped suspension unit utilizing resilient material at the ends of the Z's and utilizing pivotal means between the base and the device to be vibrated.

Another object of the invention is to provide an improved helical conveyor utilizing a suspension as disclosed herein.

Another object of the invention is to provide an improved trough type vibratory conveyor.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
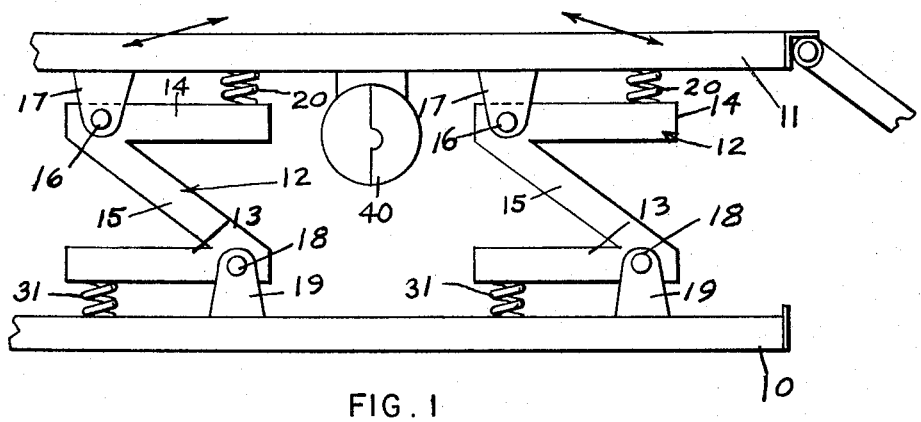
FIG. 1 is a schematic side view of a vibratory device according to the invention.

Now with more particular reference to the drawings, the vibratory device shown in FIG. 1 has a base 10 and a work element 11, which may be, for example, the trough of a conveyor or it could be a support for a vibrating screen, sorting device, or the like. The element 11 is supported on the Z-shaped support elements 12. Each Z-shaped support element 12 has a lower bar 13 and upper bar 14 and an intermediate bar 15. Each upper bar 14 is pivoted at its distal end at 16 to a bracket 17 which is fixed to the element 11. Diametrically opposite the pivot 16 on the distal end of the lower bar 13 of each support element is a pivot 18, which is pivotally connected to the brackets 19. Brackets 19 are fixed to the base 10.

A resilient element 20 is supported between the upper end of the Z suspension unit 12 remote from the pivot 16. This resilient element 20 could be a resilient member such as a rubber element, or it could be an inflated member such as member 120 in FIG. 4, and it can be adjustable so that it could be moved toward and away from the pivot 16 by means of adjusting elements such as 230 in FIG. 2, which is intended to illustrate that the resilient member 220 may be moved by means of a screw toward and away from the pivot 216 at the will of the operator.

The resilient members 31 in FIG. 1 are supported between the base 10 and the bars 13 of the suspension member at a position remote from the pivots 18. These resilient members 31 could be, as indicated, resilient members 20 and 31, made of either rubber, inflated members, or any other suitable resilient element or device.

Figure 2:
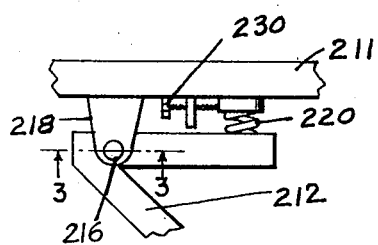
FIG. 2 is a partial view of another embodiment of the invention.
Figure 4:
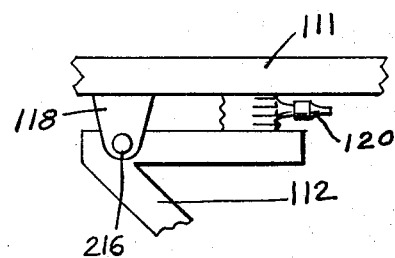
FIG. 4 is a partial view of another embodiment of the invention.

It is to be understood that the elements 111 in FIG. 4 and 211 in FIG. 2 are similar to the work element 11 in FIG. 1. Likewise, the Z-bars 212 in FIG. 2 and 112 in FIG. 4, pivots 116 and 216, and brackets 118 and 218, are similar to the corresponding numbers in FIG. 1, having numbers the same as the last two digits.

Figure 3:
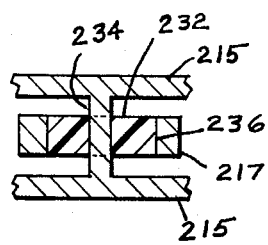
FIG. 3 is a partial plan view of yet another embodiment of the invention.

In the embodiment of the invention shown in FIG. 3, the torsional rubber members 232 are shown, bonded to the pivot 234, which could be supported on a base, and the outer periphery of the resilient member 232 could be bonded at 236 to a Z-bar 215. Thus, when the element 11 was vibrated, the resilient and self-aligning members 232 would act as a resilient pivotal support for the elements 11 and would assist the action of the resilient members 20 and 31.

Figure 5:
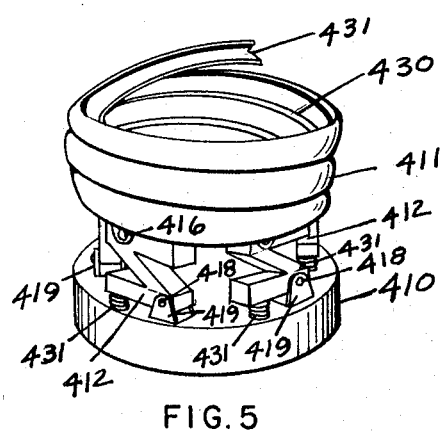
FIG. 5 is a view of yet another embodiment of the invention.

In the embodiment of the invention shown in FIG. 5, a base 410 is shown supporting a helical conveyor 411, of the type familiar to those skilled in the art and of the type shown in Williams Patent No. 2,615,184. The helical conveyor 411 will have a spiral track 430 therein, which may guide articles of manufacture up to the discharge end 431.

The conveyor 411 will be supported on the Z-shaped bars 412, which may be supported by pivots 416 to the bowl 411 and may be supported by pivots 418 to the brackets 419, which will be fixed to the base 410. Resilient members 431 will support the bowl on the base, and other resilient members under the upper end of the lower legs of the Z-bar similar to the resilient members 20 in FIG. 1 will support the upper end of the bowl.

Figure 6:
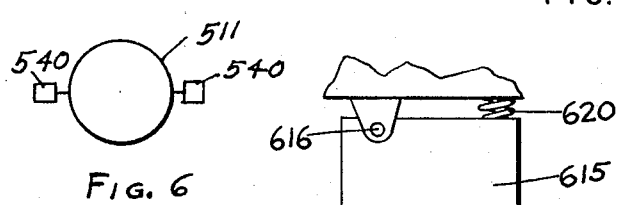
FIG. 6 is a plan view of actuating members for the conveyor of FIG. 5.

In all of the embodiments of the invention, a vibrator, such as indicated at 40 in FIG. 1, will be provided. The vibrator 40 in FIG. 1 may be of the type shown in Loveless Patent No. 3,173,300 and may be fixed directly to the member 11. Such a vibrator could be supported on the bowl shown in FIG. 6. Two such vibrators indicated at 540 could be spaced from each other on diametrical opposite sides of the bowl as shown in the embodiment of the invention shown in FIG. 6. The bowl 511 will be supported on a suspension system such as shown in FIG. 5 and the vibrators 540 will be fixed to the bowl on diametrically opposite sides thereof. It will be noted that this type of vibrator has special utility in the combination shown, since it introduces forces in the direction that is desired for the materials to move.

Figure 7:
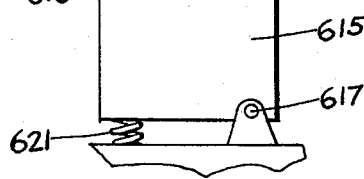
FIG. 7 is a partial view of another embodiment of the invention.

In the embodiment of the invention shown in FIG. 7, the plate 615 is swingably attached to the base by pivot 617 and swingably attached to the bowl of a conveyor or the like by pivot 616.

The spring 620 may be a helical compression spring, and it rests between the conveyor bowl and the plate 615 at a position spaced from pivot 616 and in alignment with pivot 617.

In like manner, the helical compression spring 620 rests on the base, between the base and the plate 615. Thus, when the bowl vibrates, the springs 620 and 621 will alternately be compressed and depressed, thereby imparting vibration to the conveyor bowl.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A suspension for a vibratory conveyor member comprising, a vibratory conveyor member, a plurality of leg members for supporting said vibratory conveyor member, each of said leg members having four supports disposed generally at four positions defining the four corners of a rectangle, a base member, a first said support position having means pivotally attached to said base member, a second said support point having means remote from said first support point and having means attached to said vibratory conveyor member to be supported, first resilient means engaging said leg member and disposed between said leg member and said base member at a position spaced from but adjacent said first support position, and second resilient means engaging said leg member and disposed between said leg member and said base member, said second resilient means being at a position remote from said second support means.

2. The suspension member recited in claim 1 wherein said leg member is Z-shaped,
said Z-shape having a first bar, a second bar, and an intermediate member attached together in Z-shaped relation,
said first support point being disposed adjacent the position where said first bar is attached to said intermediate bar,
said second support point is attached to said leg adjacent the point where said second leg is attached to said intermediate member.

3. The suspension member recited in claim 2 wherein said resilient members are helical springs.

4. The combination recited in claim 2 wherein said resilient members are inflated resilient members.

5. The suspension member recited in claim 1 wherein means is provided to adjust the position of said resilient members toward and away from said first and said second support points.

6. The combination of claim 1 wherein
said suspension members being disposed in linear relation to said member to be vibrated and attached to said member at said second support point,
and means on said member to be vibrated to vibrate said member.

7. The combination recited in claim 6 wherein said resilient means is a helical spring.

8. The combination recited in claim 6 wherein said resilient member comprises an inflatable member.

9. The combination recited in claim 6 wherein said resilient member engages means to adjust its position relative to said support points.

10. The combination of claim 1 wherein
a plurality of said suspension members are arranged in circular relation,
and said member to be vibrated is adapted to be vibrated in a helical path.

References Cited

UNITED STATES PATENTS

| | | | |
|---|---|---|---|
| 1,234,447 | 7/1917 | Cole | 198—220 X |
| 2,706,112 | 4/1955 | Carrier | 198—220 X |
| 2,894,397 | 7/1959 | Brumagin | 198—220 X |
| 2,914,313 | 11/1959 | Morris | 198—220 X |
| 3,045,810 | 7/1962 | Holt | 198—220 |

EVON C. BLUNK, *Primary Examiner.*

M. L. AJEMAN, *Assistant Examiner.*